United States Patent [19]
Miller et al.

[11] Patent Number: 4,806,028
[45] Date of Patent: Feb. 21, 1989

[54] BEARING RACE KEEPER RING RETENTION SLEEVE

[75] Inventors: Richard F. Miller; David A. Foster, both of Castalia, Ohio

[73] Assignee: General Motors Corporation, Detroit, Mich.

[21] Appl. No.: 208,694

[22] Filed: Jun. 20, 1988

[51] Int. Cl.$^4$ ............................................. F16C 43/04
[52] U.S. Cl. .................................... 384/510; 384/585; 384/537
[58] Field of Search ............... 384/510, 537, 585, 599, 384/560, 517, 563

[56] References Cited

U.S. PATENT DOCUMENTS

| | | | |
|---|---|---|---|
| 1,796,610 | 3/1931 | Modler | 384/585 |
| 4,125,298 | 11/1978 | Heurich et al. | 384/537 |
| 4,640,632 | 2/1987 | Brandenstein et al. | 384/537 |
| 4,688,952 | 8/1987 | Setele | 384/537 |

Primary Examiner—Lenard A. Footland
Attorney, Agent, or Firm—Patrick M. Griffin

[57] ABSTRACT

A self crimping retention sleeve is slipped over the end of a bearing shaft and closely over a pair of race piece keeper rings and deformed radially inwardly into a shaft retention groove by the application of an axial force inwardly on the sleeve, allowing the sleeve to be installed with very limited radial access.

3 Claims, 3 Drawing Sheets

BEARING RACE KEEPER RING RETENTION SLEEVE

This invention relates to bearings in general, and specifically to a novel and improved retention sleeve to prevent the separation of a bearing race keeper ring from a shaft.

BACKGROUND OF THE INVENTION

U.S. Pat. No. 4,179,167 to Lura et al, assigned to the assignee of the present invention, shows an integral rear wheel bearing of the type typically referred to as a generation III bearing. In this type of bearing, a rotatable, wheel supporting shaft that provides ball raceways on its outer surface is supported by a double row of balls within a surrounding vehicle mounted hub that also provides raceways, on its inner surface. Here, however, one inner raceway on the shaft is a separable piece, so as to allow a greater ball complement than would be possible with a fully integral conrad assembled design. Consequently, some means is necessary to retain the separate inner race piece to the shaft. The patent covers a particular means for doing so which, in general, includes a pair of C shaped keeper rings that fit into a keeper ring groove cut into the shaft adjacent a face of the race piece. The width of the C rings is chosen so as to fit into the keeper ring groove and snugly against a face of the race piece. The race, then, is axially trapped on the shaft between the ball complement on one side and the keeper rings on the other.

A means is also provided to prevent the keeper rings from separating from the keeper ring groove. This consists of a metal sleeve that is slipped over the keeper rings and over another groove cut into the shaft that is adjacent to the keeper ring groove. Then, a suitable tool is brought to bear on the outside of the sleeve to swage it radially into the groove, and over the outer surface of the keeper rings. The keeper rings are thus kept bottomed in the keeper ring groove, and the sleeve is secured to the shaft by virtue of being rolled into the groove. A requirement for this system is that the end of the shaft be easily accessible so that the sleeve can be swaged into place. This is the case for the bearing illustrated there, since the end of the shaft extends significantly out of the hub, and there is nothing to block access. That clear radial access may not be available in all cases, however.

SUMMARY OF THE INVENTION

The invention provides a novel sleeve and shaft configuration that cooperate to allow a retention sleeve to be installed with no more than an axially inward pressure on the sleeve, where there is little radial access.

In the preferred embodiment, the shaft has an axially outwardly facing shoulder formed thereon that stands above the surface of the shaft, between the keeper ring groove and the end of the shaft. Just outboard of the shoulder is a retention groove cut into the surface of the shaft. As disclosed, an edge of the shoulder comprises one side of the retention groove. The race piece and keeper rings are first installed as described above, and then a retention sleeve is installed to prevent the keeper rings from separating.

The sleeve is generally cylindrical and sized so as to slip over over the end of the shaft and over the keeper rings before being secured in place. Specifically, the sleeve has a skirt at one end that fits closely over the outside of the keeper rings while the other end extends past the very end of the shaft. The inside of the sleeve has a stop that abuts the shaft shoulder when the sleeve is slipped on. The sleeve also has a crimping portion between the stop and the other end of the sleeve that overlays the retention groove when the stop hits the shoulder. The crimping portion is designed so as to be radially inwardly deformable with the application of only an axial force that tends to collapse the sleeve. In the embodiment disclosed, the crimping portion is a stress concentration groove that is cut into the outer surface of the sleeve adjacent to the stop.

Once the sleeve is slipped over the end of the shaft far enough to abut the sleeve stop with the shaft shoulder, a sufficiently large inward pressure on the far end of the sleeve will deform the metal of the sleeve in the area under the stress concentration groove radially inwardly. The deformed metal flows over the edge of the shoulder and into the shaft retention groove, securely locking the sleeve to the shaft. Thereafter, the keeper rings will be prevented from separating from their groove since they will be closely covered and held in by the skirt of the sleeve. The tool that applies the inward force need be no larger in diameter than the end of the sleeve itself, so radial access may be quite limited without affecting installation.

It is, therefore, a general object of the invention to provide a self crimping retention sleeve that cooperates with a shaft so as to prevent the separation of race keeper rings and which can be applied easily in conditions where radial access is very limited.

It is another object of the invention to provide such a means including a shoulder on the shaft that engages a stop on the sleeve when the sleeve is slipped over the shaft so as to locate a sleeve skirt over the keeper rings and a also locate radially inwardly deformable crimping portion of the sleeve over a retention groove in the shaft, so that axial pressure only applied to the sleeve will deform a portion of the sleeve into the retention groove and lock the sleeve to the shaft, without the need for any radial access larger than the diameter of the free end of the sleeve.

It is another object of the invention to provide a sleeve in which the crimping portion is a stress concentration groove formed in the outside of the sleeve adjacent to the stop.

DESCRIPTION OF THE PREFERRED EMBODIMENT

These and other objects and features of the invention will appear from the following written description, and from the drawings, in which.

Figure 1:
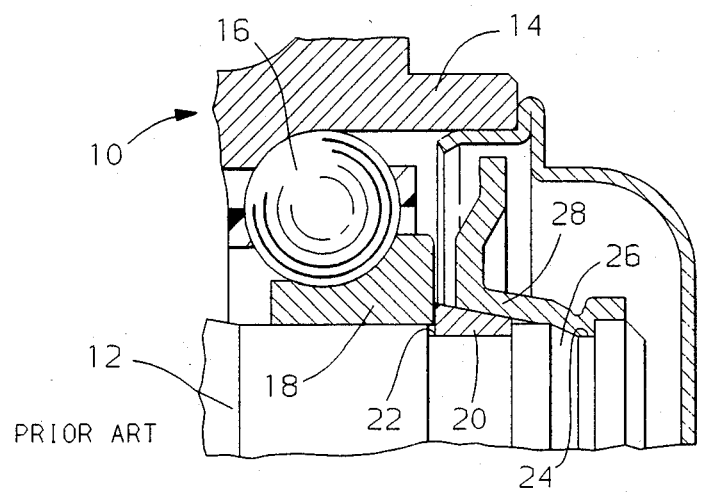
FIG. 1 is a partial cross sectional view of the prior art retention sleeve and shaft described above.

Referring first to FIG. 1, in the prior art system described above a bearing 10 has a shaft 12 that extends through and out significantly past the end of a hub 14, supported by a complement of balls 16. After the separate race piece 18 has been installed, suitably sized C shaped keeper rings, of which one is seen at 20, are inserted into a keeper ring groove 22 adjacent to race 18. Keeper ring 20 applies a preload to race 18 and prevents race 18 from moving to the right, assuming that ring 20 can be prevented from separating from groove 22. To that end, a retention groove, indicated generally at 24, is formed near the end of shaft 12. Rather than being square cut, like keeper ring groove 22, retention groove 24 has a sloped or conical side 26 nearest the keeper ring groove 22. This is so that there will not be any unacceptable stress risers in the groove 24 caused by keeper ring 20 being forced to the right. A steel retention sleeve 28 is slipped over the end of shaft 12 and over the keeper ring 20 and retention groove 24. Since shaft 12 extends out significantly beyond the edge of hub 14, there is adequate access to sleeve 28 for a suitable tool to be brought in to swage or roll it radially inwardly, into groove 24 and tightly over ring 20. Thus, ring 20 is prevented from separation.

Figure 2:
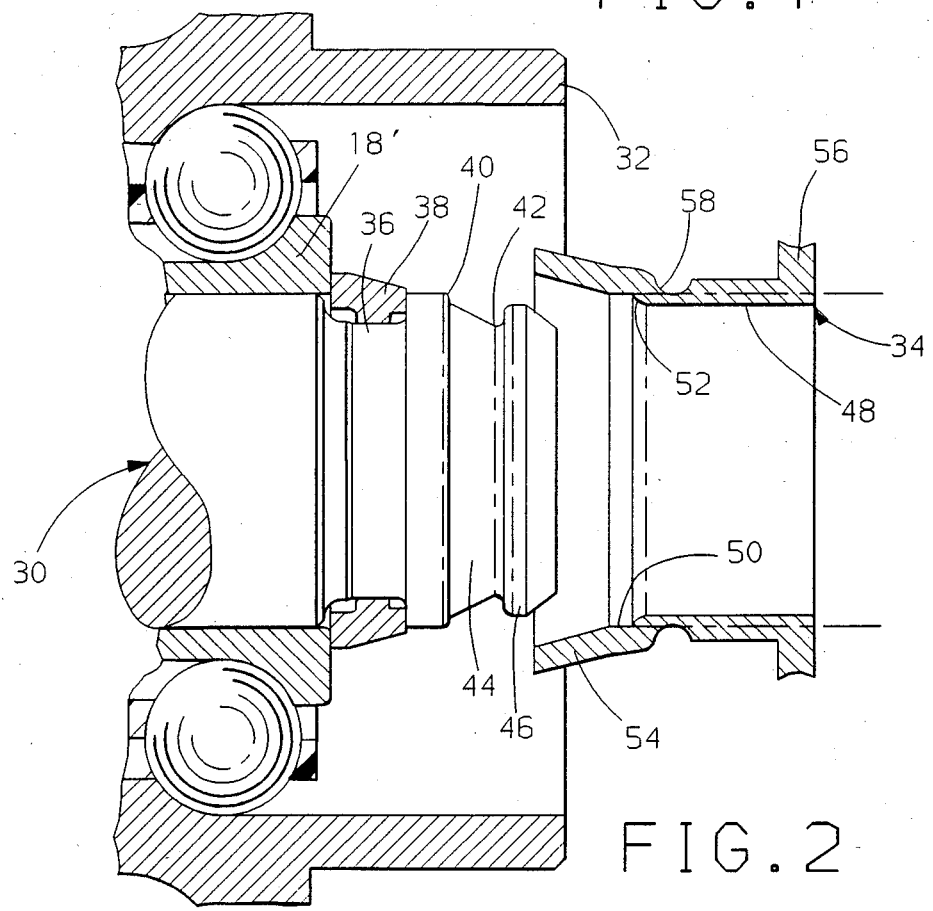
FIG. 2 is a cross sectional view of the retention sleeve of the invention and the end of the shaft prior to installation.

Referring next to FIG. 2, it will be seen that this unimpeded radial access is not always available. As shown here, a similar shaft 30 has its end blocked radially by a longer hub 32, or by some other obstruction. It is desired to install the same race piece, indicated at 18′, to shaft 30 at a similar location and retain it in similar fashion to race piece 18 above. The invention provides such a means, which includes a novel end configuration of shaft 30 that cooperates with a novel retention sleeve designated generally at 34. Shaft 30 also has a keeper ring groove 36 cut circumferentially into shaft 30 axially inboard from the end thereof. Groove 36 has bottom corners that are more rounded than groove 22, so the C shaped keeper rings 38 that fit therein to preload race piece 18′ are relieved at their corners to assure proper seating. Keeper rings 38 have a conical or sloped outer surface. Next to keeper ring groove 36 is an axially outwardly facing shoulder 40. Between shoulder 40 and the very end of shaft 30 is a retention groove, designated generally at 42, cut circumferentially into the surface of shaft 30. Specifically, in the embodiment disclosed, the left side of retention groove 42 and the edge of the shoulder 40 are a shared surface. The bottom surface 44 of retention groove 42 is not flat, but is sloped down, radially inward and axially outward to the right side. Adjacent the right side of retention groove 42 is a cylindrical surface 46, and from there the surface of shaft 30 slopes down to its very end. Therefore, shoulder 40 sits at a greater radius than, or higher than, the rest of the surface of shaft 30 that lies to the right of it.

Sleeve 34 is, which is made of steel or other suitable material, is generally cylindrical and sized so as to slip over over the end of shaft 30 and the keeper rings 38. More specifically, in the embodiment disclosed, shaft 30 is stepped, with an axially longer but smaller diameter inner surface 48 that merges with an axially shorter but larger diameter inner surface 50 across a rounded edge 52. Sleeve surface 48 is close in diameter to the shaft surface 46, and sleeve surface 50 is close in diameter to the shaft shoulder 40. From surface 50, a conical skirt 54 flares out to one end of sleeve 34. A short flange 56 comprises the opposite end of sleeve 34. Between the rounded edge 52 and flange 56, but very near the rounded edge 52, a stress concentration groove 58 is cut into the outer surface of sleeve 34. Groove 58 runs circumferentially all the way round and is generally C shaped in cross section. As seen by the dotted lines, which lie on the neutral axis of sleeve 34, groove 58 is cut about halfway into the thickness of sleeve 34.

Figure 3:
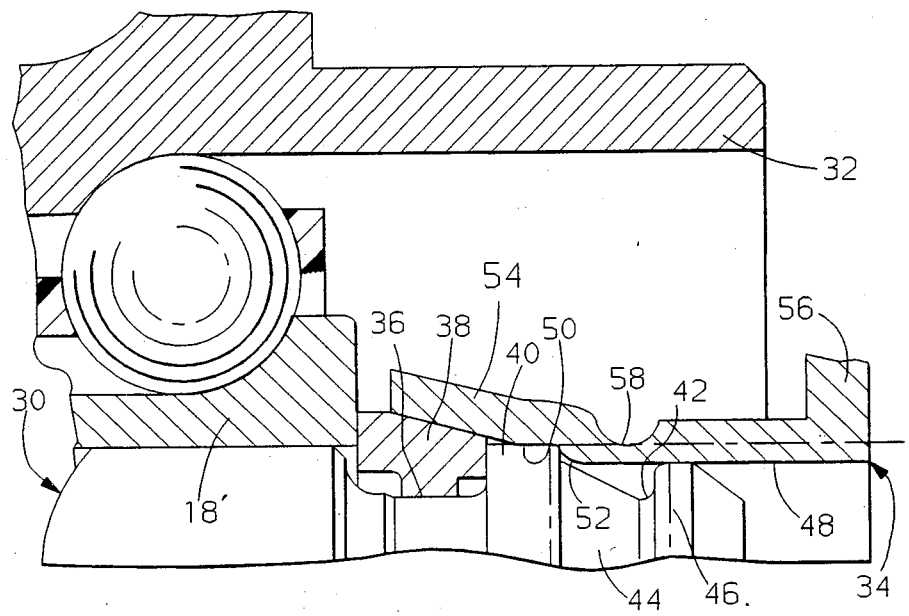
FIGS. 3 through 6 show successive stages in the installation of the sleeve as the crimping portion continuously deforms inwardly.

Referring next to FIG. 3, after the race piece 18′ and keeper rings 38 are in place, sleeve 34 is slipped over the end of shaft 30. More specifically, as sleeve 34 is moved to the left, the sleeve smaller diameter surface 48 slides closely over shaft surface 46, the sleeve larger diameter surface 50 slides closely over shoulder 40, and the sleeve skirt 54 moves in closely over the sloped outer surface of the keeper rings 38. Sleeve 34 stops when rounded edge 52 abuts shoulder 40, providing a positive stop. Edge 52 hits shoulder 40 before the sleeve skirt 54 can apply enough axial force to the keeper rings 38 to affect their preload on race piece 18′. The positive stop serves to locate the stress concentration groove 58 over the retention groove 42. The flange 56 extends past the end of shaft 30, although not necessarily beyond the obstruction 32. Therefore, the only clear radial access may be not much more than the diameter of the free end of sleeve 34, but that is sufficient, as will be next described.

Figure 4:
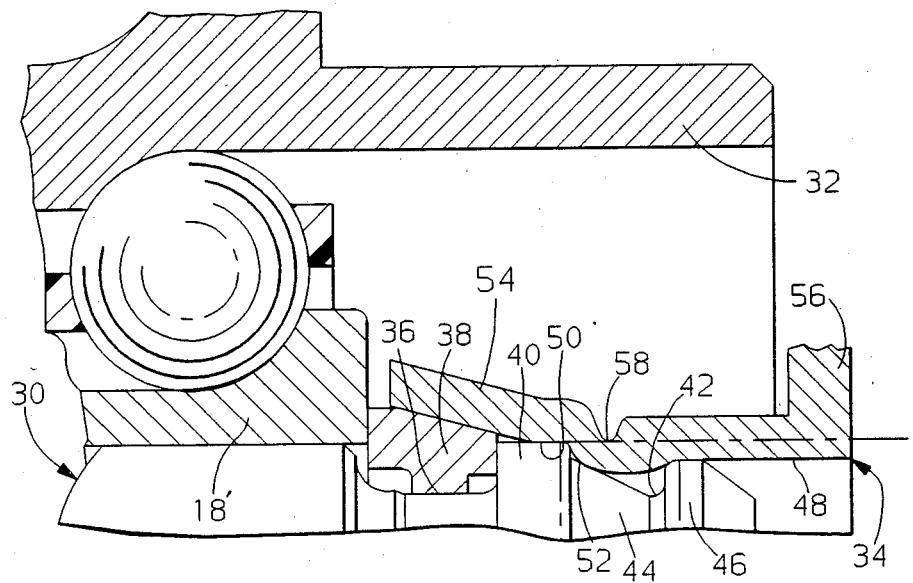

Referring next to FIG. 4, once sleeve 34 has reached the positive stop, an inward pressure is applied to the flange 56. This can be done with any suitable tool, not illustrated, which need be no larger in diameter than the flange 56 itself. Therefore, the radial obstruction 32 does not interfere with the process. The inward force tends to collapse one end of sleeve 34 toward the other, with the result that the reaction force back from shoulder 40 is concentrated at the groove 58. The sleeve metal just under the groove 58 is deformed radially inwardly and the groove 58 begins to close up. As shown in FIG. 4, the deformed metal has moved down over the edge of the shoulder 40 and radially into the retention groove 42, but has not yet quite reached the sloped bottom surface 44.

Figure 5:
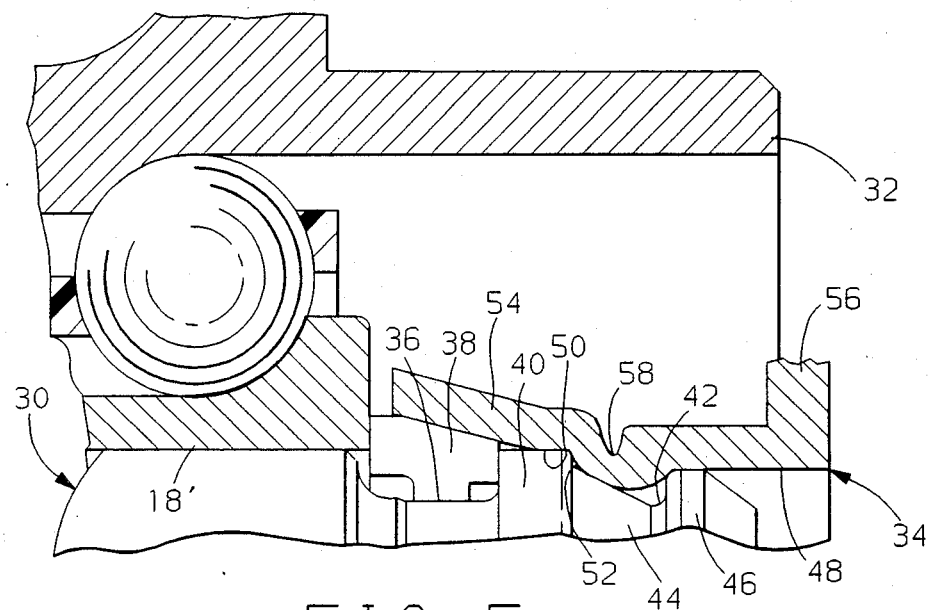
Figure 6:
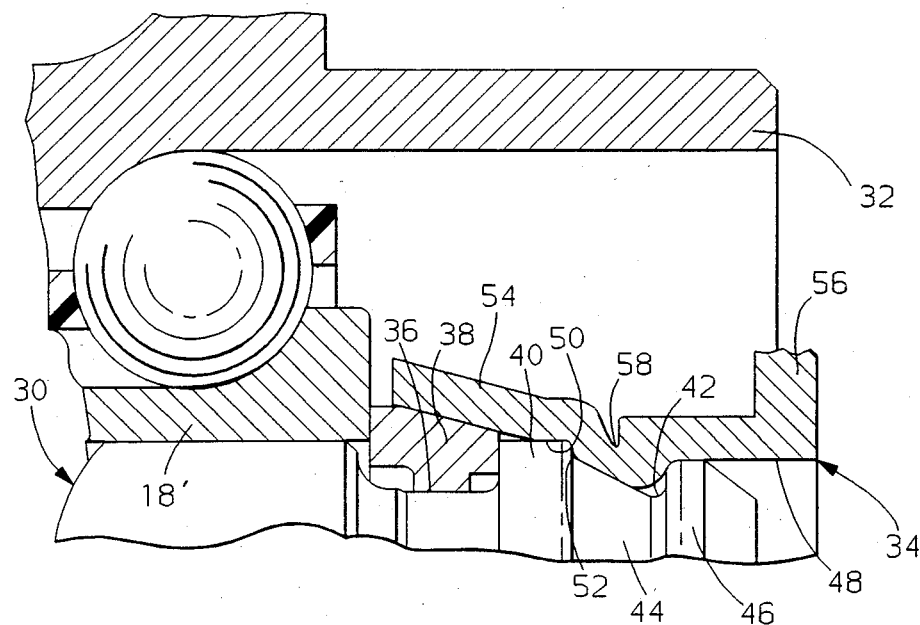

Referring next to FIGS. 5 and 6, the continued deformation of sleeve 34 is illustrated. The metal below the stress concentration groove 58 deforms farther inwardly, eventually hitting the sloped surface 44. With continued inward pressure on flange 56, the deformed metal flows gown the sloped surface 44, in effect back filling the retention groove 42 all the way to the right side of groove 42. The groove 58 continues to close up. The positive stop provided by the shoulder 40 assures that very little of the effect of the axially inward force on flange 56 will be seen in inward movement of the skirt 54. Should skirt 54 be moved inwardly slightly, however, the matching slopes of the inside of skirt 54 and the outside of the keeper rings 38 allow them to slide past one another without ill effect. The greater the flow of metal down the sloped groove surface 44, the more securely sleeve 34 will be locked to the shaft 30, and prevented from moving significantly in or out. The keeper rings 38 will thereby be prevented from separating from groove 36.

Variations of the preferred embodiment disclosed may be made within the spirit of the invention. The retention groove cut into the shaft between the shoulder 40 and the very end of the shaft need not be directly adjacent to the shoulder 40. However, having the the left side of the retention groove coincident with the shoulder 40 gives a compact configuration and allows for an easy and efficient deformation of the sleeve 34. Likewise, the retention groove could be square bottomed. However, the sloped bottom surface 44 of groove 42 provides the dual advantage of avoiding a stress riser at the corner of groove 42 while allowing continued deformation of the metal to flow progressively farther radially inwardly to increase the security of sleeve 34's lock to shaft 30. Other crimping portions for sleeve 34 other than the stress concentration groove 58 could be used which would still allow the sleeve 34 to be self crimping, that is, to be radially inwardly deformable with no more than an axially inward push. A portion of the sleeve could be strategically weakened, as by the provision of a weaker layer of differing, softer metal, or with cut outs or slots of some sort. So long as the sleeve was configured so as to deform radially inwardly at the correct point under a collapsing force, it could work in similar fashion. The groove 58 is particularly advantageous, however, as it is easy to located and form. Therefor, it will be understood that it is not intended to limit the invention to just the embodiment disclosed .

The embodiments of the invention in which an exclusive property or privilege is claimed are defined as follows:

1. A means for preventing a keeper ring from separating from a keeper ring groove cut into the surface of a wheel bearing shaft at a location axially inwardly spaced from the end of said shaft, comprising, an axially outwardly facing shoulder extending radially above the surface of said shaft between said keeper ring groove and the end of said shaft, a retention groove cut into the surface of said shaft between said stop shoulder and the end of said shaft, and, a generally cylindrical sleeve sized so as to fit over the end of said shaft including a skirt at one end sized so as to fit closely over the outside of said keeper ring, said sleeve further including a stop that is engageable with said shaft shoulder so as to locate said skirt over said keeper ring and a crimping portion that overlays said retention groove when said sleeve stop and shaft shoulder engage and which is configured so as to be radially inwardly deformable by an axial force tending to collapse said sleeve, whereby, said sleeve may be installed on said shaft by slipping said sleeve over said shaft until said stop and shoulder engage and then applying an inward force to said sleeves thereby deforming said crimping portion radially inwardly into said retention groove to lock said sleeve to said shaft.

2. A means for preventing a keeper ring from separating from a keeper ring groove cut into the surface of a wheel bearing shaft at a location axially inwardly spaced from the end of said shaft, comprising, an axially outwardly facing shoulder extending radially above the surface of said shaft between said keeper ring groove and the end of said shaft, a retention groove cut into the surface of said shaft between said stop shoulder and the end of said shaft, and, a generally cylindrical sleeve sized so as to fit over the end of said shaft including a skirt at one end sized so as to fit closely over the outside of said keeper ring, said sleeve further including a stop that is engageable with said shaft shoulder so as to locate said skirt over said keeper ring and a stress concentration groove cut into the outer surface of said sleeve that overlays said retention groove when said stop and shoulder engage, whereby, said sleeve may be installed on said shaft by slipping said sleeve over said shaft until said stop and shoulder engage and then applying an inward force to said sleeve, thereby deforming said sleeve radially inwardly in the area of said stress concentration groove into said shaft retention groove groove to lock said sleeve to said shaft.

3. A means for preventing a keeper ring from separating from a keeper ring groove cut into the surface of a wheel bearing shaft at a location axially inwardly spaced from the end of said shaft, comprising, an axially outwardly facing shoulder extending radially above the surface of said shaft between said keeper ring groove and the end of said shaft, a retention groove cut into the surface of said shaft adjacent said shoulder with one side of said retention groove being formed by an edge so said shoulder, and, a generally cylindrical sleeve sized so as to fit over the end of said shaft including a skirt at one end sized so as to fit closely over the outside of said keeper ring, said sleeve further including a stop on the inner surface that is engageable with said shaft shoulder so as to locate said skirt over said keeper ring and a stress concentration groove cut into the outer surface of said sleeve adjacent to said stop, whereby, said sleeve may be installed on said shaft by slipping said sleeve over said shaft end until said stop and shoulder engage and then applying an inward force to said sleeve, thereby deforming the portion of said sleeve below said stress concentration groove radially inwardly over said shoulder edge and into said shaft retention groove to lock said sleeve to said shaft.

* * * * *